US008002089B2

(12) United States Patent  
Jasso et al.

(10) Patent No.: US 8,002,089 B2
(45) Date of Patent: Aug. 23, 2011

(54) SYSTEMS AND METHODS FOR PROVIDING A HAPTIC DEVICE (75) Inventors: Alexander Jasso, San Jose, CA (US); David W. Bailey, Redwood City, CA (US)

(73) Assignee: Immersion Corporation, San Jose, CA (US)

( * ) Notice: Subject to any disclaimer, the term of this patent is extended or adjusted under 35 U.S.C. 154(b) by 1376 days.

(21) Appl. No.: 10/937,931

(22) Filed: Sep. 10, 2004

(65) Prior Publication Data

US 2006/0054427 A1    Mar. 16, 2006

(51) Int. Cl.
*F16D 63/00* (2006.01)
(52) U.S. Cl. ......................................... 188/83; 188/267
(58) Field of Classification Search .................... 188/83, 188/267, 267.1, 267.2, 156, 158–160, 161, 188/163, 164, 166, 171; 345/156, 161, 163, 345/167, 184; 715/701, 702
See application file for complete search history.

(56) References Cited

U.S. PATENT DOCUMENTS

| | | |
|---|---|---|
| 3,157,853 A | 11/1964 | Hirsch |
| 3,198,293 A | 8/1965 | Mathews |
| 3,220,121 A | 11/1965 | Cutler |
| 3,497,668 A | 2/1970 | Hirsch |
| 3,517,446 A | 6/1970 | Corlyon et al. |
| 3,795,150 A | 3/1974 | Eckhardt |
| 3,812,936 A | 5/1974 | Dane |
| 3,902,687 A | 9/1975 | Hightower |
| 3,903,614 A | 9/1975 | Diamond et al. |
| 4,160,508 A | 7/1979 | Salisbury |
| 4,236,325 A | 12/1980 | Hall et al. |
| 4,262,240 A | 4/1981 | Arai |
| 4,400,790 A | 8/1983 | Chambers et al. |
| 4,513,235 A | 4/1985 | Acklam et al. |
| 4,553,080 A | 11/1985 | Cannon et al. |
| 4,560,983 A | 12/1985 | Williams |
| 4,581,491 A | 4/1986 | Boothroyd |
| 4,599,070 A | 7/1986 | Hladky et al. |
| 4,652,805 A | 3/1987 | Kohn |
| 4,706,294 A | 11/1987 | Ouchida |

(Continued)

FOREIGN PATENT DOCUMENTS

EP    0111992    6/1984

(Continued)

OTHER PUBLICATIONS

Adelstein, "Design and Implementation of a Force Reflecting Manipulandum for Manual Control research," DSC-vol. 42, Advances in Robotics, Edited by H. Kezerooni, pp. 1-12, 1992.

(Continued)

*Primary Examiner* — Pam Rodriguez
(74) *Attorney, Agent, or Firm* — Kilpatrick Townsend & Stockton LLP (57) ABSTRACT

Systems and methods for providing a haptic device are described. In one described system, a first brake surface of a first element contacts a second brake surface of a second element. At least one actuator is configured to exert a force on at least one of the first and second elements. A flexure is coupled to at least one of the first element, the second element, a housing, a manipulandum, and a shaft coupled to the manipulandum. The flexure provides a degree of rotational flexibility to the manipulandum when the at least one actuator exerts the force. The described system may include a processor in communication with the at least one actuator for providing the haptic effects.

54 Claims, 6 Drawing Sheets

U.S. PATENT DOCUMENTS

| | | | |
|---|---|---|---|
| 4,708,656 | A | 11/1987 | De Vries et al. |
| 4,713,007 | A | 12/1987 | Alban |
| 4,758,165 | A | 7/1988 | Tieman et al. |
| 4,823,106 | A | 4/1989 | Lovell |
| 4,859,922 | A | 8/1989 | Tauchenitz et al. |
| 4,868,549 | A | 9/1989 | Affinito et al. |
| 4,891,764 | A | 1/1990 | McIntosh |
| 4,930,770 | A | 6/1990 | Baker |
| 4,934,694 | A | 6/1990 | McIntosh |
| 4,947,097 | A | 8/1990 | Tao |
| 5,019,761 | A | 5/1991 | Kraft |
| 5,022,407 | A | 6/1991 | Horch et al. |
| 5,035,242 | A | 7/1991 | Franklin |
| 5,038,089 | A | 8/1991 | Szakaly |
| 5,078,152 | A | 1/1992 | Bond |
| 5,086,296 | A | 2/1992 | Clark |
| 5,116,051 | A | 5/1992 | Moncrief et al. |
| 5,116,180 | A | 5/1992 | Fung et al. |
| 5,185,561 | A | 2/1993 | Good et al. |
| 5,186,695 | A | 2/1993 | Mangseth et al. |
| 5,187,630 | A | 2/1993 | MacKay et al. |
| 5,189,355 | A | 2/1993 | Larkins et al. |
| 5,191,320 | A | 3/1993 | MacKay |
| 5,212,473 | A | 5/1993 | Louis |
| 5,220,260 | A | 6/1993 | Schuler |
| 5,240,417 | A | 8/1993 | Smithson et al. |
| 5,270,689 | A | 12/1993 | Hermann |
| 5,271,290 | A | 12/1993 | Fischer |
| 5,275,174 | A | 1/1994 | Cook |
| 5,299,810 | A | 4/1994 | Pierce |
| 5,309,140 | A | 5/1994 | Everett |
| 5,334,027 | A | 8/1994 | Wherlock |
| 5,368,484 | A | 11/1994 | Copperman et al. |
| 5,381,080 | A | 1/1995 | Schnell et al. |
| 5,382,373 | A | 1/1995 | Carlson et al. |
| 5,396,266 | A | 3/1995 | Brimhall |
| 5,466,213 | A | 11/1995 | Hogan |
| 5,492,312 | A | 2/1996 | Carlson |
| 5,542,672 | A | 8/1996 | Meredith |
| 5,547,382 | A | 8/1996 | Yamasaki |
| 5,559,432 | A | 9/1996 | Logue |
| 5,577,581 | A | 11/1996 | Eberwein et al. |
| 5,578,238 | A | 11/1996 | Weiss et al. |
| 5,580,249 | A | 12/1996 | Jacobsen et al. |
| 5,591,082 | A | 1/1997 | Jensen et al. |
| 5,665,946 | A | 9/1997 | Nishijima et al. |
| 5,683,615 | A | 11/1997 | Munoz |
| 5,705,085 | A | 1/1998 | Munoz et al. |
| 5,711,746 | A | 1/1998 | Carlson |
| 5,714,978 | A | 2/1998 | Yamanaka et al. |
| 5,721,566 | A | 2/1998 | Rosenberg et al. |
| 5,730,655 | A | 3/1998 | Meredith |
| 5,766,016 | A | 6/1998 | Sinclair |
| 5,767,836 | A | 6/1998 | Scheffer et al. |
| 5,767,839 | A | 6/1998 | Rosenberg |
| 5,781,172 | A | 7/1998 | Engel et al. |
| 5,785,630 | A | 7/1998 | Bobick et al. |
| 5,816,105 | A | 10/1998 | Adelstein |
| 5,816,823 | A | 10/1998 | Naimark et al. |
| 5,914,705 | A | 6/1999 | Johnson et al. |
| 5,944,151 | A | 8/1999 | Jakobs et al. |
| 6,002,184 | A | 12/1999 | Delson et al. |
| 6,008,800 | A | 12/1999 | Pryor |
| 6,087,829 | A | 7/2000 | Jager |
| 6,100,476 | A | 8/2000 | Adamietz et al. |
| 6,111,577 | A | 8/2000 | Zilles et al. |
| 6,128,006 | A | 10/2000 | Rosenberg et al. |
| 6,147,422 | A | 11/2000 | Delson et al. |
| 6,154,201 | A | 11/2000 | Levin et al. |
| 6,211,861 | B1 | 4/2001 | Rosenberg et al. |
| 6,215,470 | B1 | 4/2001 | Rosenberg et al. |
| 6,219,034 | B1 | 4/2001 | Elbing et al. |
| 6,243,078 | B1 | 6/2001 | Rosenberg |
| 6,262,717 | B1 | 7/2001 | Donohue et al. |
| 6,271,828 | B1 | 8/2001 | Rosenberg et al. |
| 6,271,833 | B1 | 8/2001 | Rosenberg et al. |
| 6,271,834 | B1 | 8/2001 | May et al. |
| 6,283,859 | B1 | 9/2001 | Carlson et al. |
| 6,307,285 | B1 | 10/2001 | Delson et al. |
| 6,315,088 | B1 | 11/2001 | Gustin et al. |
| 6,337,678 | B1 | 1/2002 | Fish |
| 6,348,772 | B1 | 2/2002 | May |
| 6,373,465 | B2 | 4/2002 | Jolly et al. |
| 6,394,239 | B1 | 5/2002 | Carlson |
| 6,400,352 | B1 | 6/2002 | Bruneau et al. |
| 6,420,806 | B2 | 7/2002 | Wittig |
| 6,468,158 | B1 | 10/2002 | Ootori et al. |
| 6,480,752 | B1 | 11/2002 | Blume et al. |
| 6,486,872 | B2 | 11/2002 | Rosenberg et al. |
| 6,589,117 | B1 | 7/2003 | Moritome et al. |
| 6,591,175 | B2 | 7/2003 | Numata et al. |
| RE38,242 | E | 9/2003 | Engel et al. |
| 6,613,997 | B2 | 9/2003 | Oster et al. |
| 6,636,202 | B2 | 10/2003 | Ishmael, Jr. et al. |
| 6,637,311 | B2 | 10/2003 | Barden |
| 6,640,940 | B2 | 11/2003 | Carlson |
| 6,646,632 | B2 | 11/2003 | Wegmuller et al. |
| 6,854,573 | B2 | 2/2005 | Jolly et al. |
| 6,864,620 | B2 | 3/2005 | Takeuchi et al. |
| 2001/0052893 | A1 | 12/2001 | Jolly et al. |
| 2002/0044132 | A1 | 4/2002 | Fish |
| 2002/0067336 | A1 | 6/2002 | Wegmuller et al. |
| 2002/0084983 | A1 | 7/2002 | Boldy |
| 2002/0158842 | A1 | 10/2002 | Guy et al. |
| 2003/0006958 | A1 | 1/2003 | Onodera |
| 2003/0038774 | A1 | 2/2003 | Piot et al. |
| 2003/0079948 | A1 | 5/2003 | Jolly et al. |
| 2003/0080939 | A1 | 5/2003 | Kobayashi |
| 2003/0184518 | A1 | 10/2003 | Numata et al. |
| 2004/0040800 | A1 | 3/2004 | Anastas et al. |
| 2004/0206611 | A1 | 10/2004 | Kobayashi |

FOREIGN PATENT DOCUMENTS

| | | |
|---|---|---|
| EP | 0349086 | 1/1990 |
| EP | 0640902 A2 | 3/1995 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "A Virtual Environment System for the Study of Human Arm Tremor," Ph.D. Dissertation, Dept. of Mechanical Engineering. MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. On Haptic Interfaces for Virtual Envir. & Teleoperator Systs. (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System for Dual-Arm Teleoperation," SOAR '89 Workshop, JSC, Houston, TX, Jul. 25-27, 1989.

Bejczy et at., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450. pp. 1327-1335, 1980.

Bejczy, et at., "Universal Computer Control System (UCCS) for Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by The Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bullein, "Mouse Ball-Actuating Device With Force and Tactile Feedback," vol. 32, No. 98, Feb. 1990.

Iwata, "Pen-based Haptic Virtual Environment," 0-7803-1363-1/93 IEEE, pp. 287-292, 1993.

Jacobsen et al., "High Performance. Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag): Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

McAffee, "Teleoperator Subsystem/Telerobot Demonstrator: Force Reflecting Hand Controller Equipment Manual." JPL D-5172, pp. 1-50. A1-A36. B1-85, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of a Non-reactive, Fingertip, Tactile Display for Interaction with Remote Environments." Cooperative Intelligent Robotics in Space, Rui J. deFigueiredo et al., Editor. Proc. SPIE vol. 1387. pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "Controlling Dissipative Magnetic Particle Brakes in Force Reflective Devices," DSC-vol. 42, Advances in Robotics. pp. 63-70, ASME 1992.

Russo, "The Design and Implementation of a Three Degree of Freedom Force Output Joystick." MIT Libraries Archives Aug. 14, 1990, pp. 1-131, May 1990.

Scannell, "Taking e Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42. Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

"The HELI-CAL® Flexure," web page at http://www.heli-cal.com/, as available via the internet and printed on Jun. 14, 2004.

"Flexible Couplings, " web page at http://www.heli-cal.com/Html/Products/prod01.htm, as available via the internet and printed on Jun. 14, 2004.

"The HELI-CAL Flexure Concept . . . In Spring Applications," web page at http://www.heli-cal.com/Html/Products/Springs.htm. as available via the internet and printed on Jun. 14, 2004.

"HELICAL Products," web page at http://www.heli-cal.com/Html/Products/index.htm, as available via the Internet and printed on Jun. 14, 2004.

"HELICAL Products Index," web page at http://www.heli-cal.com/Html/Products/CoupGuid/index.htm, as available via the internet and printed on Jun. 14. 2004.

SYSTEMS AND METHODS FOR PROVIDING A HAPTIC DEVICE

FIELD OF THE INVENTION

The present invention generally relates to user interface devices. The present invention more particularly relates to providing haptic feedback.

BACKGROUND

Electronic device manufacturers strive to produce a rich interface for users. Conventional devices utilize visual and auditory cues to provide feedback to a user. In some interface devices, kinesthetic feedback (such as active and resistive force feedback), and/or tactile feedback (such as vibration, texture, and heat), is also provided to the user, more generally known collectively as "haptic feedback." Haptic feedback can provide cues that enhance and simplify the user interface.

Some conventional haptic devices may not be capable of providing a "barrier" haptic effect. For example, a device may be incapable of detecting when a user wishes to move a manipulandum away from a barrier limiting position provided by a resistive haptic device. Some conventional haptic devices may also not be able to provide a user with a wide variety of types and levels of haptic effects, and may be costly and complex to produce.

SUMMARY

Embodiments of the present invention provide systems and methods for providing a haptic device. One embodiment of the present invention comprises a first element having a first brake surface, a second element having a second brake surface, at least one actuator, and a flexure. The second brake surface may be configured to contact the first brake surface. The at least one actuator may be configured to exert a force on at least one of the first and second elements. The flexure may be coupled to at least one of the first element, the second element, a housing, a manipulandum, and a shaft coupled to the manipulandum. The flexure may be configured to provide a degree of rotational flexibility to the manipulandum when the at least one actuator exerts the force on at least one of the first and second elements.

This embodiment is mentioned not to limit or define the invention, but to provide an example of an embodiment of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for providing a haptic feedback device. A device may incorporate a variety of technologies for providing haptic feedback, comprising both active and resistive devices. Active haptic feedback devices, comprising, for example, devices incorporating motors, generally add energy to a system; resistive devices, such as devices incorporating brakes, generally remove energy from the system.

Active haptic actuators may utilize, for example, alternating current (AC) or direct current (DC) electric motors and/or generators. Resistive haptic actuators may utilize, for example, electromagnetic brakes, magnetic particle brakes, magnetorheologic or electrorheologic brakes, or magnetic (non-friction) brakes. Electromagnetic brakes utilize a magnetic core, a coil, and a magnetic target. When a current is applied to the coil, the magnetic core acts upon the magnetic target. Magnetic particle brakes utilize a powder comprising particles of a magnetic material. When a current is applied, the particles line up. Rheologic fluid brakes utilize a fluid that changes viscosity when a current is applied. A magnetic brake generates a magnetic field, and when a piece of metal passes through the magnetic field, an anti-current is generated, causing a resistance to movement of the metal.

Embodiments of the present invention may be utilized by a broad array of devices, comprising cell phones, personal digital assistants, cameras, camcorders, MP3 players, and other electronic devices.

Figure 1:
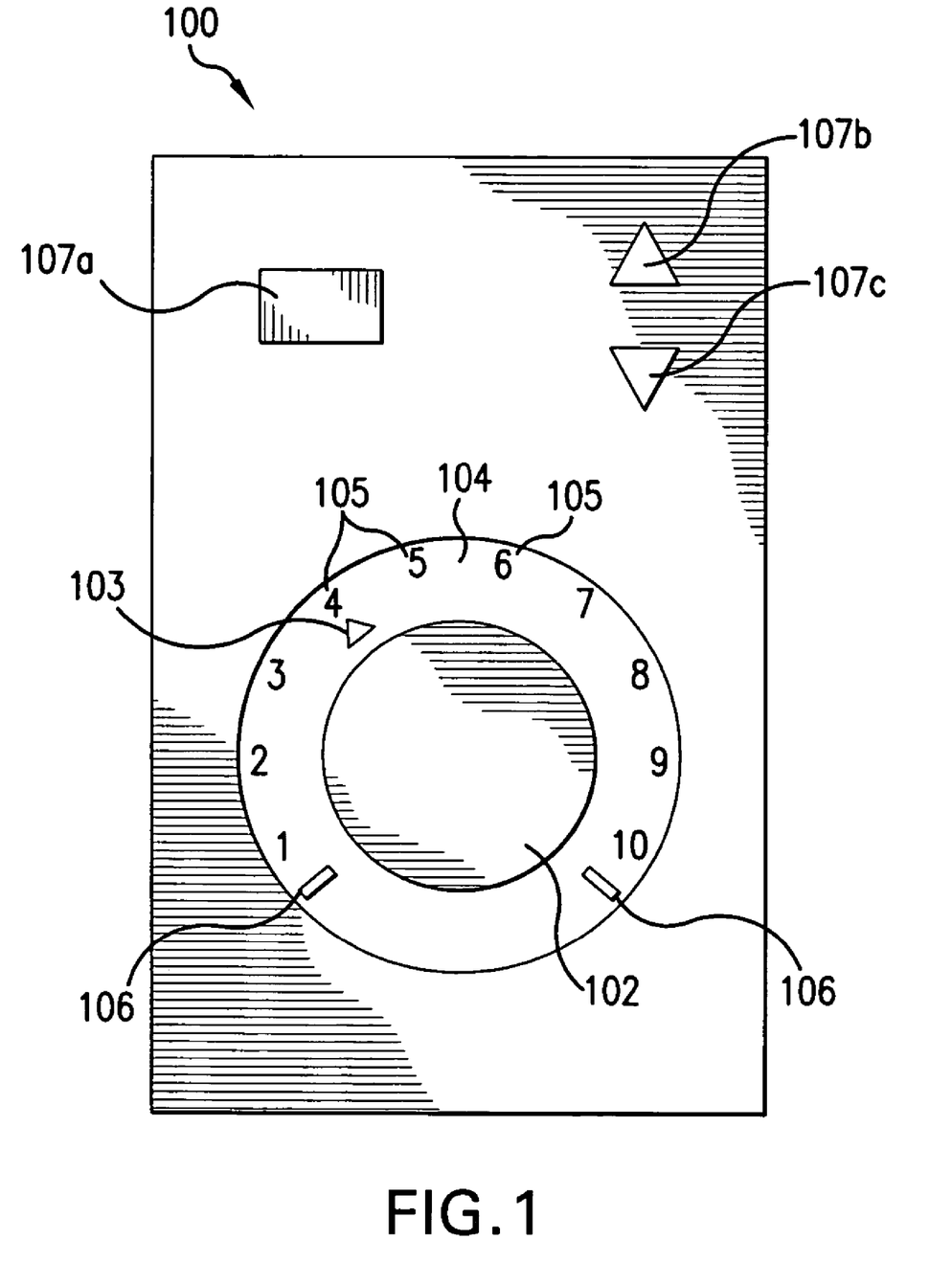
FIG. 1 illustrates a device incorporating one embodiment of the present invention.

Referring now to the drawings in which like numerals indicate like elements throughout the several figures, FIG. 1 illustrates a device 100 incorporating one embodiment of the present invention. The device 100 shown in FIG. 1 comprises a remote control for a television. The device 100 comprises a control knob 102 manipulandum and several button manipulanda, interface elements that a user of the device 100 can manipulate (in other embodiments, a single manipulandum may be used). In the embodiment shown, the control knob 102 is configured to control a variety of functions.

An LCD control screen 104 encircles the control knob 102. The control screen 104 is configured to provide a user of the device 100 with an indication of what function the control knob 102 is presently able to control, what level is presently selected, and what other levels the user may select by rotating the control knob 102. For example, the control screen 104 provides, as shown in FIG. 1, a pointer 103, level indicators 105, and limit indicators 106 for the current function. In one embodiment, pressing the control knob 102 into the device 100 may change the function the control knob 102 is controlling. In one such embodiment, the control screen 104 may display one or more different pointers 103, level indicators 105, or limit indicators 106 for each different function the control knob 102 is configured to control.

The button manipulanda shown comprise a plurality of buttons 107a, 107b, and 107c. In the embodiment shown, the user may utilize the buttons 107a-c to control functions of the television in communication with the device 100. For example, the button manipulandum 107a is configured to power the television on and off, and the button manipulanda 107b, 107c are configured to adjust the channel being output up and down, respectively.

In the embodiment shown, the control knob 102 is presently capable of controlling the volume level of a television in communication with the device 100. The level indicators 105 displayed by the control screen 104 shown each correspond to a volume level, where the higher the numeric value of the level indicator 105 that the pointer 103 is presently pointing at, the higher the volume level of the television. A device according to the present invention may provide haptic feedback in various physical mechanisms, such as the control knob 102 shown in FIG. 1. For example, in the embodiment shown in FIG. 1, a processor (not shown) in communication with an actuator (not shown), such as an electromagnetic brake haptic actuator, may be configured to generate a control signal operable to cause the actuator to provide a haptic effect to the control knob 102 to enhance the user's interaction with the device 100.

For example, the limit indicators 106 shown correspond to points at which the actuator in communication with the control knob 102 may provide a "barrier" haptic effect. The barrier effect may substantially prevent the control knob 102 from turning past the limit indicator 106 when the pointer 103 points toward either limit indicator 106. The device 100 shown comprises a flexure (not shown) in communication with the control knob 102 that is configured to provide a degree of rotational flexibility to the control knob 102.

For example, in one embodiment, the flexure may be configured to allow the control knob 102 to continue to turn three degrees past either limit indicator 106 when the actuator provides a barrier effect that indicates the pointer 103 is presently pointing toward either the low volume limit indicator 106 or the high volume limit indicator 106, indicating a state at which the minimum or maximum permitted volume level, respectively, is being output by the television. In other embodiments, a flexure may be configured to allow a greater or lesser amount of flexibility to a manipulandum when an actuator provides a barrier effect. The flexure may further be configured to provide a restoring force to the control knob 102 once the user has released the knob.

For example, in the embodiment shown in FIG. 1, if a user has turned the control knob 102 counter-clockwise past the "1" level indicator 105 to the low volume limit indicator 106, the actuator may provide a barrier effect to indicate to the user the lowest possible volume has been selected. The flexure may allow the user to turn control knob 102 three degrees past the low volume limit indicator 106 when the pointer 103 points towards the low volume limit indicator 106, and restore the control knob three degrees in a clockwise direction once the user releases or otherwise reduces the amount of force with which he or she is providing to the control knob 102. A sensing device (not shown) in communication with the control knob 102 and the processor may sense this recoil of the control knob 102 and may send a position signal that is configured to indicate to the processor that the user has released the control knob 102. The processor may then, in turn, send a signal to the actuator configured to cause the actuator to discontinue outputting the barrier effect to the control knob 102.

Figure 2:
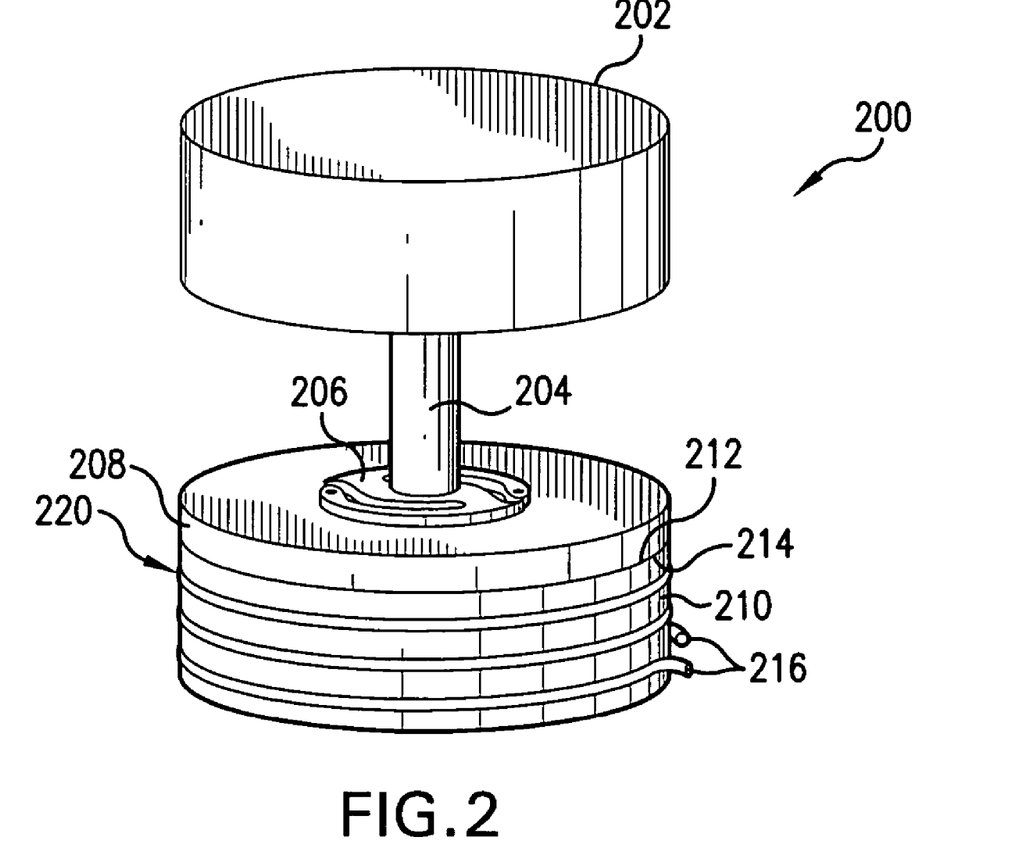
FIG. 2 is a perspective view of a device according to one embodiment of the present invention.

Referring now to FIG. 2, a perspective view of a device 200 employing one embodiment of the present invention is shown. The device 200 shown comprises an injection-molded plastic manipulandum. In the embodiment shown in FIG. 2, the manipulandum comprises a control knob 202. The control knob 202 may comprise, for example, the control knob (102) shown in the device (100) of FIG. 1. In other embodiments, the manipulandum may comprise another form (such as, for example, a trackball, a scroll wheel, a joystick, a rocker switch, a button, or a knob), another materials (such as a metal, a wood, a rubber, or a ceramic), or may be fashioned using a different method (such as by machining, extruding, forging, or casting).

At its center, the control knob 202 shown is coupled to a shaft 204. The control knob 202 and shaft 204 rotate around a common axis. The opposing end of the shaft 204 is coupled to a flexure 206. The flexure shown is fashioned from plastic by an injection molding technique. In other embodiments, a flexure may be fashioned by a different technique (such as machining, bending, extruding or forging), and/or from a different material or combination of materials (such as a metal, a wood, and/or a rubber). The flexure is coupled at two points along its outer edge to a first element 208. The flexure 206 is shown with greater detail in FIG. 3.

Referring still to FIG. 2, the first element 208 and a second element 210 are shown. The first element 208 shown has a first brake surface 212 (facing the second element). The second element 210 is mechanically grounded and therefore prevented from rotating. The first element 208 rotates around the same common axis as the control knob 202 and the shaft 204. Because the first element 208 shown in FIG. 2 is coupled to the shaft 204 via the flexure 206, the first element 208 may rotate with the control knob 202 unless otherwise prevented.

The second element 210 shown has a second brake surface 214 that faces the first brake surface 212. A coil 216 of copper wire surrounds the second element 210. In other embodiments, other electrically conductive materials may be used to fabricate a coil 216, such as tin or a superconductor. In the embodiment shown, the first element 208 comprises a magnetic target, and the second element 210 comprises a magnetic core. The first element 208 in the embodiment shown comprises a magnetic material, such as a steel disk. In other embodiments, the first element 208 may comprise other materials, such as non-metallic materials such as polymers, and may comprise other shapes, such as rectangular, triangular, or polygonal.

Together, the first element 208, second element 210, and the coil 216 comprise an electromagnetic brake actuator 220. In the embodiment shown, the first and second brake surfaces 212, 214 are configured to contact each other when the actuator 220 is actuated. The actuator 220 shown is configured to exert a force on the first element 208 that brings the first and second brake surfaces 212, 214 into contact when an electric current is passed through the coil 216, creating a magnetic field.

In other embodiments, the actuator 220 may comprise other types of brakes, such as magnetic particle, magnetorheologic, electrorheologic, magnetic, or piezo-electric brakes, and/or may comprise an active actuator, such as a DC motor. The coil and the magnetic core second element 210 of the actuator 220 in FIG. 2 are not free to rotate (although in other embodiments they may rotate). The second element 210 may not move in the axial direction of the shaft 204. In other embodiments, the second element 210 may be configured to move in the axial direction of the shaft. In one such embodiment, the second brake surface 214 may move in the axial direction of the shaft 204 in order to contact the first brake surface 212.

Still referring to FIG. 2, in the embodiment shown, the second brake surface 214 comprises a ring around the top surface of the electromagnetic core second element 210. In other embodiments the second brake surface 214 may be separate from the actuator 220, and may comprise other shapes, such as an incomplete ring, a rectangle, a triangle, and a polygon. The first brake surface 212 of the first element 208 is configured to contact the second brake surface 214 shown when the actuator 220 is activated. In other embodiments, the first brake surface 212 may be configured to separate from the second brake surface 214 when the actuator is activated.

In the embodiment shown, the second brake surface 214 is substantially concentric with the first brake surface 212. In other embodiments, the second element 210, and/or the second brake surface 214 may be substantially non-concentric with the first element 208 and/or the first brake surface 212. In one such embodiment, the second brake surface 214 may be configured to contact a portion of the first brake surface 212 substantially offset from the shaft 204.

In the embodiment shown in FIG. 2, when the coil 216 receives a current, it provides a magnetic attractive force to the second element 210. The second element 210 may then exert the magnetic attractive force on the first element 208. The magnetic attractive force may provide an increased normal force between the first and second brake surfaces 212, 214. Contact between the second brake surface 214 and the first brake surface 212 may cause a resistance to movement of the control knob 202. The resistance may cause the control knob 202 to stop or may exert a force the user can overcome. In another embodiment, a spring mounted between the first element 208 and the second element 210 of the actuator 220 may cause the two elements to separate when the coil 216 is not energized. In one such embodiment, when the coil 216 receives a pulsed current, a haptic effect in the form of a vibration may be created.

Embodiments of the present invention may utilize various other active and/or resistive actuators as well. For example, in one embodiment, an active actuator may provide resistive effects. In one such embodiment, a DC motor in communication with a manipulandum may be short-circuited or may act as a generator, causing a resistance to the turning of a drive shaft coupled to the motor. In an embodiment in which a motor is set up as a generator, the motor can generate current back to a power supply during certain resistive effects, such as braking effects and/or damping effects. In one such embodiment, a processor may use such a generated current to sense a movement of a manipulandum.

Other embodiments of the present invention may utilize a piezo-electric actuator. In a piezo-electric actuator, a voltage may be applied to a piezo-ceramic, causing the crystals to elongate and thereby changing the shape of the material. A change in shape of a piezo-ceramic material may be used to provide a mechanical force. In some such embodiments, some type of amplification may be utilized to provide a mechanical force.

One embodiment of the present invention may comprise a controller (not shown), such as a processor, that may control the application of current generated by a power supply (not shown) to the coil 216 shown in FIG. 2. Processors can comprise, for example, digital logical processors capable of processing input, executing algorithms, and generating output as necessary to create the desired tactile sensations in the input device in response to an input received from an input device. Such controllers may comprise a microprocessor, an Application Specific Integrated Circuit (ASIC), and state machines.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein.

A controller according to the present invention may be capable of generating a variety of haptic effects. For example, a controller may create effects, such as detents, between the level indicators 105 in the volume control application described with reference to FIG. 1. The controller may create additional effects as well, comprising, for example, bumps, vibrations and stops by applying various currents to the coil 216.

Some of the elements of the embodiment shown in FIG. 2 may be housed in a housing (not shown). In other embodiments, the device may be assembled without such a housing, or an element of the device 200 may comprise an integral part of a housing. The housing may comprise an upper housing portion, and a housing base. The upper housing portion and the housing base may be fashioned from a non-magnetic material, such as a plastic, to avoid interference with the operation of the electromagnetic actuator 220. In other embodiments, the upper housing portion and/or the housing base may be fashioned from other materials, such as a magnetic material.

A housing base may be fixably fastened to a surface, and/or mechanically grounded using any conventional method of fastening, such as adhesives, screws, and collet-pins. In one embodiment, the second element 210 may be mechanically grounded to a housing base. A housing base may be configured to securely receive a sensing device (not shown). Such a housing base may be configured to secure and prevent rotation of the upper housing portion, and/or to restrict the rotation or any other suitable type of movement of at least one of a first element 208, a second element 210, a coil 216, and a sensing device.

In other embodiments, a housing base may be configured to allow the rotation of the entire actuator 220 and/or a sensing device. A housing base may be further configured to receive a bushing. A bushing may be configured to receive a terminal point of the shaft 204. Such a bushing may be fashioned from bronze, or another suitable material, and may further be configured to permit the shaft 204 to rotate, and to constrain the movement of the shaft 204 axially. In one embodiment, a spring may be mounted between a bushing and the actuator 220 to keep the first and second brake surfaces 212, 214 in contact, and/or to provide axial flexibility to the manipulandum 202.

Figure 3:
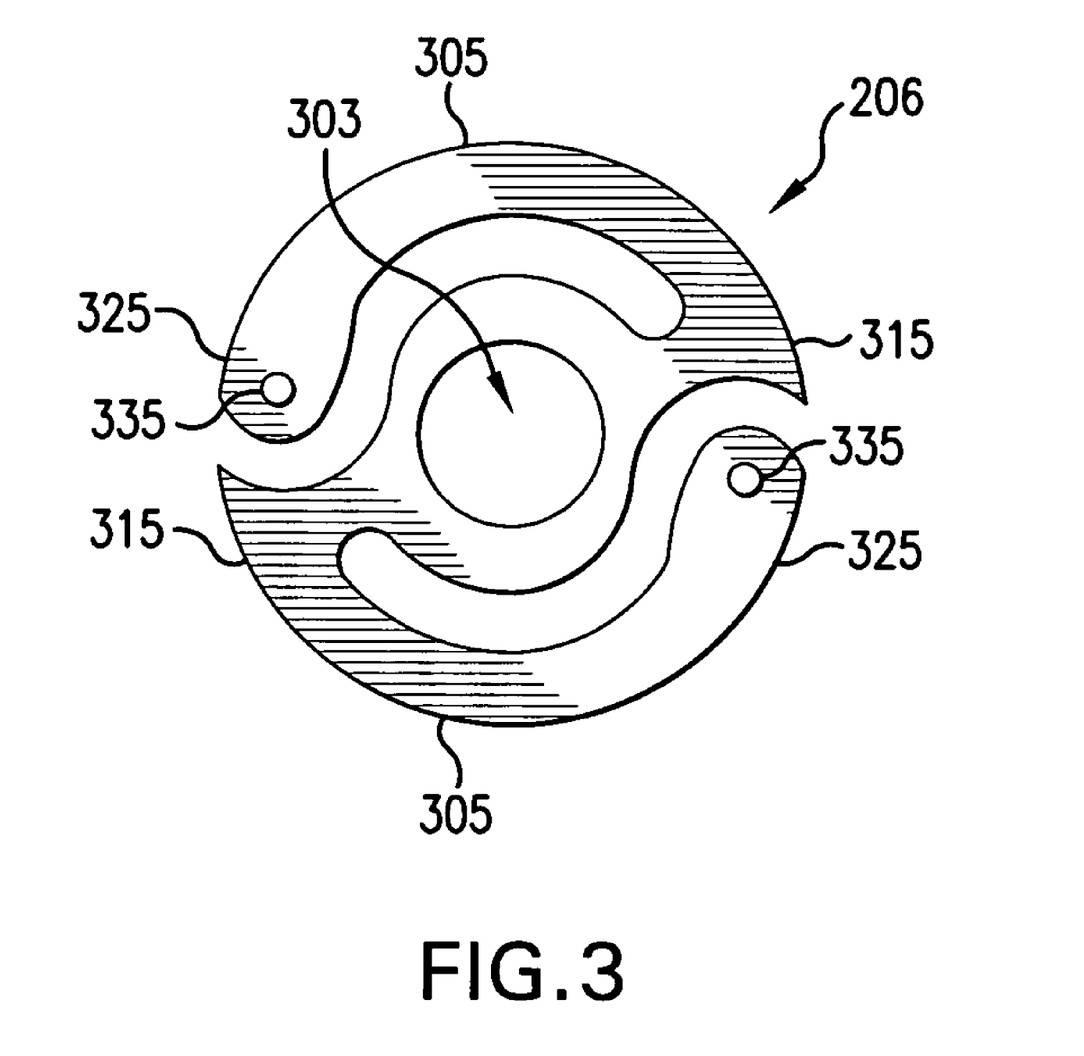
FIG. 3 is a plan view of a flexure according to the embodiment shown in FIG. 2.

Referring now to FIG. 3, a plan view of the flexure 206 shown in FIG. 2 is shown. The flexure 206, as viewed in FIG. 3, is substantially circular in shape. The flexure 206 comprises a substantially circular aperture 303 at its center. In other embodiments, the flexure 206 may not comprise such an aperture, may comprise a plurality of such apertures, and/or may comprise an aperture or apertures of a different shape (such as rectangular or polygonal). The aperture 303 shown is configured to couple with the shaft 204 as shown in FIG. 2.

The flexure 206 shown is configured to securely couple with the shaft 204, thereby receiving torque input by a user of the device 200 by turning the control knob 202.

The flexure 206 shown in FIG. 3 further comprises a plurality of beams 305. Other embodiments may comprise a greater or lesser number of beams 305, or may comprise a different means for providing rotational flexibility while transmitting torque. Both of the beams 305 shown comprise a fixed end 315 and a deflectable end 325. Each fixed end 315 shown is coupled to the flexure 206. In the embodiment shown, each fixed end 315 is coupled to the flexure 206 as an integral part of the flexure 206 that has been injection molded with the rest of the flexure 206. In other embodiments, a beam or beams 305 may be otherwise coupled to the flexure 206 (such as by a rivet, a weld, an adhesive, or a screw or other fastener), or may not be coupled to the flexure 206.

The deflectable ends 325 shown are both configured to flexibly couple with an element. For example, in the embodiment shown, each deflectable end 325 comprises a pin 335. The pins 335 shown protrude from the surface of the flexure 206 shown. The pins 335 are configured to be securely received in pin-receiving apertures in the first element 208 shown in FIG. 2, thereby flexibly coupling the deflectable ends 325 of the beams 305 of the flexure 206 to the first element 208 as shown in FIG. 2. As the beams 305 deflect, the pins may rotate in pin-receiving apertures, providing a flexible coupling between the deflectable ends 325 of the flexure 206 and the first element 208.

In other embodiments, one or more deflectable ends 325 may be rigidly coupled to another element (such as the first element 208). For example, in one such embodiment, each deflectable end may comprise a plurality of pins 335, and the first element 208 may comprise a corresponding plurality of pin-receiving apertures. In such an embodiment, the arrangement of the pins 335 and pin-receiving apertures may prevent the deflectable ends 325 of the beams 305 from rotating with respect to the pin-receiving apertures of the first element 208, providing a rigid coupling between the deflectable ends 325 of the flexure 206 and the first element 208.

Each beam 305 shown in FIG. 3 is configured to provide a degree of rotational, axial, radial, lateral, and/or angular flexibility between two elements, both coupled to the flexure 206. For example, in the embodiment shown in FIG. 2, the flexure 206 is configured to provide a degree of axial flexibility and a degree of rotational flexibility between the control knob 202 and the first element 208. In that embodiment, the beams 305 of the flexure 206 are configured to provide the axial and rotational flexibility, as the shaft 204 coupled to the control knob 202 is coupled to the aperture 303 of the flexure 206, while the first element 208 is coupled the deflectable ends 325 of the beams 305 via the pins 335.

As a result of the rotational flexibility provided by the flexure 206, when the actuator 220 is actuated to bring the first and second brake surfaces 212, 214 together with a normal force sufficient to create a friction force that provides a barrier effect to the control knob 202 shown in FIG. 2 may be rotated slightly, applying stresses to the beams 305. In one embodiment, once the user discontinues turning the control knob 202, the flexure 206 may provide a restoring force to the control knob 202. The restoring force may, for example, return the control knob 202 to a position where no stresses are being applied to the beams 305. In one such embodiment, a sensing device in communication with a processor may sense the return of the control knob 202, and may send a sensor signal to the processor configured to cause the processor to stop sending a current to the coil 216 of the actuator 220. In one such embodiment, the restoring force provided by the flexure 206 and the corresponding recoil of the control knob 202 may prevent the device 200 from getting "stuck" at a point where the processor plays a barrier effect by providing the processor with a means of determining that the user has released the control knob.

As a result of the axial flexibility provided by the flexure 206, the control knob 202 may be pushed by a user, and may be configured to, for example, select a function when the control knob 202 travels axially parallel to the axis of the shaft 204. For example, the base of the shaft 204 that is coupled to the flexure 206 may comprise a metal contact that is configured to complete a circuit only when the user pushes the control knob 202.

Figure 4:
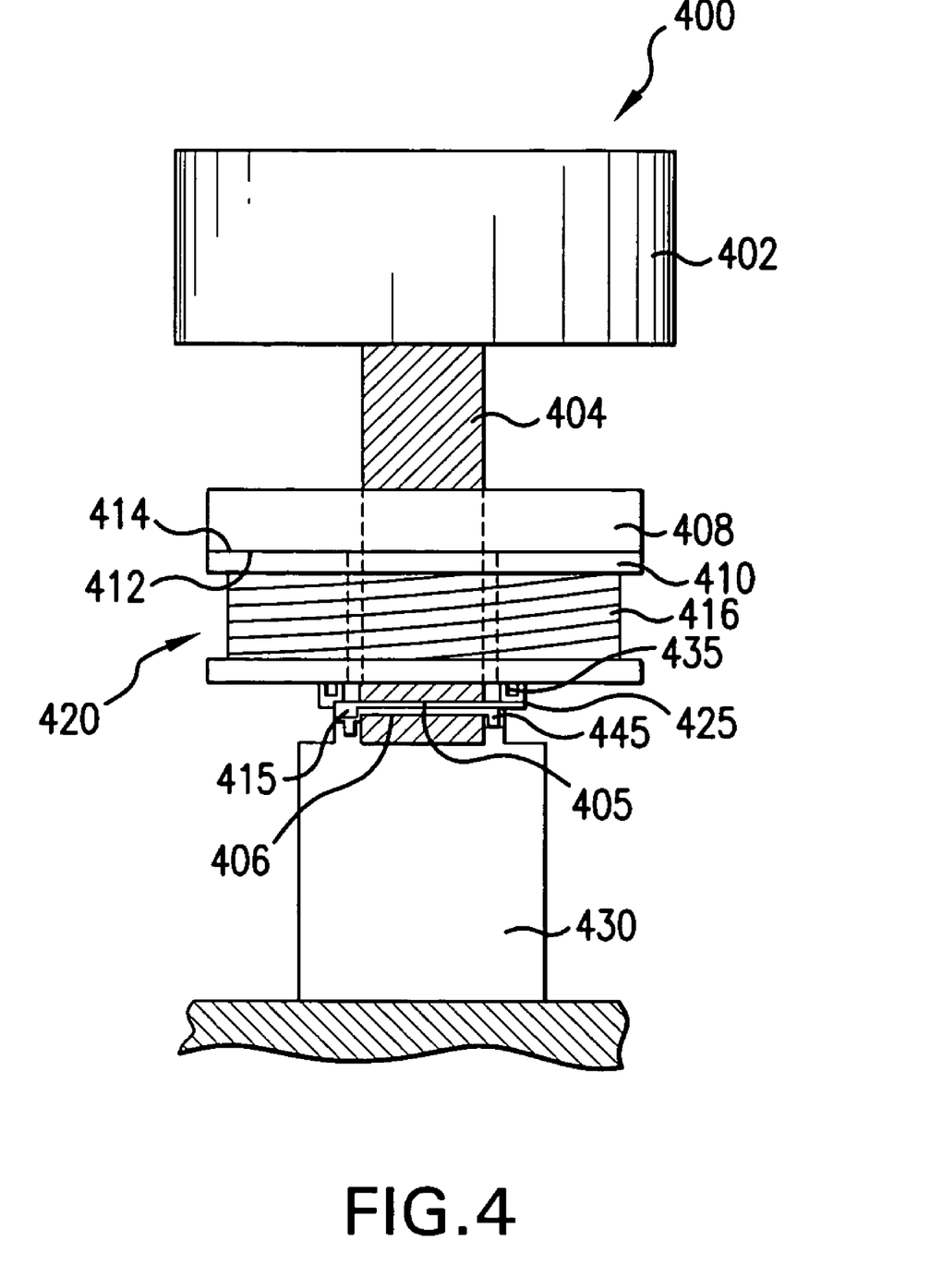
FIG. 4 is an elevation view of a device incorporating an active actuator according to an embodiment of the present invention.

Referring now to FIG. 4, a device 400 employing one embodiment of the present invention is shown. The device 400 comprises a scroll wheel 402 manipulandum. In other embodiments, the manipulandum may comprise other forms (such as a trackball, a slider, a knob, a switch, a button, etc.). The scroll wheel 402 is coupled to a shaft 404. The shaft 404 comprises a drive shaft coupled to a first actuator 430. The first actuator 430 shown comprises a DC motor. In the embodiment shown, the first actuator 430 is mechanically grounded. The shaft 404 is further coupled to a first element 408. The first element 408 is rigidly coupled to the shaft 404, and cannot be moved axially or rotationally with respect to the shaft 404. The first element 408 comprises a steel magnetic target. The first element 408 in the embodiment shown has a first brake surface 412. The first actuator 430 shown is configured to exert a first force on the first element 408.

The shaft 404 shown in FIG. 4 passes unmolested through an aperture in the center of a substantially cylindrical second element 410. The second element 410 shown comprises a steel magnetic core. The second element 410 has a second brake surface 414 configured to contact the first brake surface 412 of the first element 408. A copper coil 416 surrounds the second element 410. The first element 408, the second element 410, and the copper coil 416 together comprise an electromagnetic brake. The electromagnetic brake shown comprises a second actuator 420.

The illustrative second actuator 420 shown in FIG. 4 comprises a substantially cylindrical shape, and a substantially circular cross-section. In other embodiments, the actuator 420 may comprise other shapes and cross-sections, such as rectangular, triangular, and polygonal. In the embodiment shown, the second actuator 420 is configured to exert a second force on the first element 408 when a current is passed through the copper coil 416 the second element 410. When such a current is passed through the copper coil 416, a magnetic field is developed in the magnetic core second element 410. The magnetic field then attracts the magnetic target first element 408, creating a resistance to movement between the first and second brake surfaces 412, 414.

Referring still to FIG. 4, the device 400 further comprises a flexure 406. The flexure 406 in the embodiment shown may comprise, for example, a CNC-machined aluminum flexure. The flexure 406 shown comprises a plurality of beams 405. The beams 405 each comprise a fixed end 415 coupled to the flexure 406. The beams 405 each further comprise a deflectable end 425. Each deflectable end 425 comprises an aperture 435 configured to flexibly couple with a pin on the underside of the second element 410 as shown in FIG. 4. The pins may rotate with respect to the apertures 435 when the flexure 406 provides rotational flexibility to the manipulandum 402. The flexure 406 is thereby flexibly coupled to the underside of the second element 410. In other embodiments the flexure 406 may be rigidly coupled to the second element 210. In one such embodiment, the fixed ends 415 of the beams 405 may be rigidly coupled to the second element 410, while the deflectable ends 425 are flexibly coupled to a housing (not shown) for device 400.

The flexure 406 shown further comprises a plurality of pegs 445 on its underside. The pegs 445 are configured to be rigidly coupled to the mechanically grounded housing of the first actuator 430. As such the flexure 406 is mechanically grounded. In another embodiment, the pegs 445 may be mechanically grounded to, or otherwise rigidly coupled to, a housing (not shown) that surrounds one or more of the components of the device 400. In yet another embodiment, the flexure 406 may be an integral element of such a housing. In one such embodiment, a base of such a housing may comprise the fixed ends 415 of the beams 405, and the beams 405 may extend therefrom to the deflectable ends 425.

The flexure 406 shown in FIG. 4 is configured to provide a degree of rotational flexibility to the scroll wheel 402 manipulandum when the second actuator 420 is providing a barrier effect to the scroll wheel 402 by exerting a strong second force on the first element 408. If not for the flexure 406, when the copper coil 416 received an electric current strong enough for the second actuator 420 to provide the barrier effect, the user of the device 400 may not be able to turn the scroll wheel 402. As such, without the flexure 406, it may be possible for the device 400 to become stuck at the "barrier" if the device 400 is in communication with a processor device configured to provide a barrier effect at that rotational position.

In the embodiment shown, the first actuator 430 may be configured to operate as a generator and may be able to generate a current back to a power supply if the user turns the scroll wheel 402. In one embodiment, a processor device may sense this generated current, and thereby ascertain a movement of, and/or a position of the scroll wheel 402. The processor device may then provide a current to the copper coil 416 configured to cause the second actuator 420 to play a barrier effect by exerting the second force on the first element 408 when the scroll wheel 402 is in the appropriate position.

In a device not comprising a flexure 406, if the user is not able to easily overcome the barrier effect, and therefore turn the scroll wheel 402 and the drive shaft 404 of the first actuator 430 coupled thereto, the processor may have no way to determine that it should stop sending the current to the copper coil 416. With the addition of the flexure 406, the user may be able to turn the scroll wheel 402 a slight amount when the processor plays such a barrier effect due to the rotational flexibility provided by the flexure 406. The first actuator 430 may accordingly generate a current and transmit it back to the processor, which may be configured to sense such a current. The processor may thus stop sending the current to the copper coil 416 that is causing the barrier effect.

One device employing an embodiment of the present invention may comprise a sensing device in communication with at least one of the first element 408, the second element 410, and the scroll wheel 402 manipulandum. For example in one such embodiment, the first element 408 may comprise coding from which the sensing device may sense a movement of the first element 408 with respect to the sensing device. The coding may comprise, for example, a series of light and dark markings capable of being distinguished by an optical sensor. In other embodiments, the coding may comprise other types and configurations, such as one or more symbols, markings, etchings, holes, depressions, material additions, magnetized strips, or any other type of identifier that may help convey the relative movement or location of the first element 408, and/or the relative movement or location of the scroll wheel 402. The coding may be provided using a variety of different processes. For example, the coding may be deposited on, drawn on, ground into, melted into, or affixed to the first element 408.

In another embodiment, a sensing device may be capable of sensing a relative movement between the first element 408 and the second element 410, and/or the relative movement between the second element 410 and the sensing device. In one such embodiment, the sensing device may be mechanically grounded.

A sensing device may communicate to a processor device the relative movement between the first element 408 and the sensing device in a sensor output signal. From the sensor output signal, the processor device may be able to ascertain the position of the scroll wheel 402 coupled to the first element 408, if, for example, the scroll wheel 402 rotates with the first element 408. The processor device may be in communication with an I/O port connected to a power supply (not shown). In response to receiving the sensor output signal from the sensing device, the processor device may send a feedback control signal in the form of an electrical current generated by the power supply to the copper coil 416 to create a desired haptic effect.

Various systems and methods utilizing embodiments of the present invention may be employed. For instance, in one embodiment, a device may comprise a first element having a first brake surface and a second element having a second brake surface. The second brake surface may be configured to contact the first brake surface. Such a device may further comprise at least one actuator configured to exert a force on at least one of the first element and the second element, and a flexure coupled, either flexibly or rigidly, to at least one of the first element, the second element, a housing, a manipulandum, and a shaft coupled to the manipulandum. The at least one actuator may be configured to exert the force to provide a haptic effect to the manipulandum. The flexure may be configured to provide a degree of rotational flexibility to the manipulandum when the at least one actuator exerts the force.

In one embodiment, a flexure may be flexibly coupled to another element. For example, the flexure may be flexibly coupled to another element through the use of pins configured to rotate with respect to pin-receiving apertures as described with respect to FIGS. 2, 3 and 4. In other embodiments, a flexure may be flexibly coupled to another element using another suitable technique, such as by using a ball joint, a hinge, a joint, a bearing, or a flexible fastener. A flexure may be rigidly coupled to another element through the use adhesion, fastening (such as with a screw, a nail, a bolt, rivet, or a plurality of pins and pin receiving apertures), molding, welding, forging, extruding, binding, and other suitable techniques for rigidly coupling elements.

A device according to the present invention may further comprise a manipulandum in communication with the first and/or second elements. The manipulandum may comprise, for example, a scroll wheel fixably coupled to a shaft, wherein the shaft may be fixably coupled to at least one of the first element, the second element, and the flexure. Other embodiments may comprise other types of manipulanda, (such as buttons, knobs, switches, joysticks, and trackballs). A user of the device may use the manipulandum to communicate with the device. For instance, the user may scroll through a list of contacts on a PDA device using a scroll wheel manipulandum by rotating the scroll wheel.

In one embodiment, at least one actuator may comprise a resistive actuator (such as a magnetic particle brake, a magnetic brake, or an electromagnetic brake actuator). In one such embodiment, the first element may comprise a magnetic target, and the second element may comprise a magnetic core. In another such embodiment, the first element may comprise a magnetic core, and the second element may comprise a magnetic target. Another embodiment may comprise a plurality of actuators. In one such embodiment, the at least one actuator may comprise a first actuator configured to exert a first force on at least one of the first element and the second element, and a second actuator configured to exert a second force on at least one of the first element and the second element. In one such embodiment, the first actuator may comprise an active actuator, and the second actuator may comprise a resistive actuator coupled to the manipulandum. Both the first and the second actuators may be configured to provide a haptic effect to the manipulandum.

In one embodiment, the first element may comprise a magnetic element, such as a steel disk. The first brake surface may comprise a complete or an incomplete ring of exposed material having a coefficient of friction such that when the actuator exerts a normal force on the first element, the friction force may slow or stop a movement between the first and second brake surfaces. An example of a first brake surface may comprise a protruding steel ring on the first element.

The second element may comprise a magnetic core. The magnetic core may be fashioned from any magnetic material. For instance, the magnetic core may be fashioned from steel. In one such embodiment, the actuator may further comprise an electromagnetic coil. The electromagnetic coil may be fashioned from any material capable of conducting current. For instance, the electromagnetic coil may be fashioned from copper. In one embodiment in which the actuator comprises a magnetic core, the first element, and/or the first brake surface may be fashioned from a magnetic material. For instance, the first brake surface may be fashioned from steel, and may comprise a substantially flat circular disk. The actuator may comprise an electromagnetic brake comprising the steel electromagnetic core second element and a copper electromagnetic coil. The second brake surface may comprise a ring of substantially flat surface area at the top of the steel electromagnetic core second element. Such a device may be capable of producing a wide variety of haptic effects, comprising bumps, stops, and vibrations.

A flexure according to the present invention may be configured to provide a variety of different forces and/or flexibilities in various embodiments. For example, in one embodiment, a flexure may be configured to provide a restoring force to at least one of the first element and the second element. In one such embodiment, the restoring force may comprise a centering force with respect to a rotational axis common to the first and second elements. In another embodiment a flexure may be configured to maintain contact between a first brake surface and a second brake surface. For example, in one such embodiment, the flexure may be configured to provide a force against a bottom surface of a second element that forces a second brake surface of the second element towards a first brake surface of a first element.

In other embodiments, a flexure may be configured to provide a variety of different flexibilities to a manipulandum in communication therewith. For example, a flexure may be configured to provide a manipulandum with a degree of rotational, axial radial, lateral, and/or angular flexibility. For example, one embodiment may comprise a joystick manipulandum that may require a degree of angular flexibility. In one such embodiment, a flexure may be provided that is configured to provide the required degree of angular flexibility, and/or to provide a restoring force to the manipulandum. Another embodiment may comprise a slider manipulandum that may require a degree of radial and/or lateral flexibility. For example, in one such embodiment, a slider may comprise a substantially circular shaped slider configured to move towards the circumference of a substantially circular shaped boundary. A flexure in such an embodiment may provide a degree of radial flexibility and/or a centering force that returns the slider to the center of the circular boundary when the user has stopped contacting the slider.

A flexure may be coupled to a shaft coupled to the manipulandum in order to provide a manipulandum coupled to the same shaft with a degree of rotational flexibility or another type of flexibility. In one embodiment, at least a portion of a flexure may be mechanically grounded. In one such embodiment, at least a portion of a flexure may be mechanically grounded to a housing (such as a device housing). In another such embodiment, at least a portion of the flexure may be coupled to a surface, such as an automobile dashboard or a wall, and another portion of the flexure may be coupled to the first element or the second element.

In one embodiment, a flexure may comprise at least one beam. For example, in one such embodiment, a flexure comprising a plurality of beams may provide a degree of rotational flexibility and a degree of axial flexibility to a control knob manipulandum. In one embodiment comprising at least one beam, the at least one beam may comprise a fixed end coupled to the flexure, and a deflectable end. The deflectable end may be coupled to one of a first element, a second element, a housing, a manipulandum, and a shaft coupled to the manipulandum.

For example, in one such embodiment, a flexure may be rigidly coupled to a shaft coupled to a manipulandum, and may comprise two beams, wherein each beam comprises a fixed end coupled to the flexure, and a deflectable end flexibly coupled to a first element. In another embodiment, the flexure may be rigidly coupled to a device housing, and one or more deflectable ends of beams may be flexibly coupled to a second element. In yet another embodiment, a flexure may be rigidly coupled to a second element, and one or more deflectable ends may be flexibly coupled to a device housing.

A flexure according to the present invention may be fashioned from a wide variety of suitable materials, such as a plastic, a metal, a rubber, a wood, or any combination thereof or other suitable material. Similarly, a flexure according to the present invention may be fashioned using a wide variety of techniques, such as injection molding, CNC machining, welding, forging, bending, extruding, or any other suitable means for working with, forming, shaping, manufacturing, etc. various suitable materials.

In one embodiment, at least one element of a device according to the present invention may be housed in a housing. In one such embodiment, a flexure may comprise an integral part of the housing. For example, an injection molded plastic housing may comprise a flexure having at least one beam molded therein. A housing may be fashioned from a wide variety of materials, and may be fabricated using a variety of methods. For example, a housing may be fashioned from a plastic and may be fabricated using an injection molding technique. In one embodiment, the housing may be configured to securely receive a sensing device. In one embodiment employing a housing, the housing may comprise an electronic device housing, such as a housing configured to house a telecommunications device, a remote control, a PDA, a computer, a pointing device, or any other suitable device comprising a manipulandum.

One embodiment may further comprise a sensing device in communication with at least one of the first element, the second element, and the manipulandum. The sensing device may be configured to sense a movement of one of these elements. In one embodiment employing a sensing device, the first element may comprise a coding. The coding may comprise, for example, information from which a sensing device may be capable of sensing the relative movement between the first element and the sensing device, and the position of a manipulandum attached to the first element. For example, the coding may comprise a series of markings printed on the first element and visible to the sensing device. The sensing device may be configured to sense the coding. For instance, the sensing device may comprise an optical reader capable of sensing light and dark markings on the first element. The sensing device may be affixed to a stationary housing, and may have a substantially unobstructed line of sight to the coding. For instance, in one embodiment there may not be any physical obstructions between an optical sensor located in the sensing device and a portion of the coding.

One embodiment of the present invention may comprise a sensing device capable of sensing a relative movement between the first element, the second element, or the manipulandum and the sensing device itself. In one embodiment, a processor in communication with the sensing device may be able to ascertain the position of a manipulandum in communication with at least one of the first and second elements. In another embodiment, the sensing device may be affixed to a housing, and may be capable of sensing the relative movement of the first brake surface, the second brake surface, and/or the manipulandum with respect to the sensing device. A coding may comprise a series of light and dark markings on a circular first brake surface capable of rotation. The light and dark markings may each be unique, allowing an optical sensing device to determine the degree of relative rotation of the first element with respect to the stationary sensing device.

One embodiment may further comprise a processor in communication with the at least one actuator. The processor may be configured to generate a control signal operable to cause the at least one actuator to provide a haptic effect to the manipulandum. The processor may be configured to provide haptic feedback. The processor may receive a sensor output signal from a sensing device. A sensor output signal may comprise, for example, information about the relative movement between the first brake surface and the sensing device, the relative movement between the first and second brake surfaces, the relative movement between the second brake surface and the sensing device, and/or the position of the manipulandum. The processor may send a feedback control signal to the at least one actuator in response to the sensor output signal. For instance, the feedback control signal may comprise an electrical current. The processor may be in communication with an I/O port and a power supply.

Figure 5:
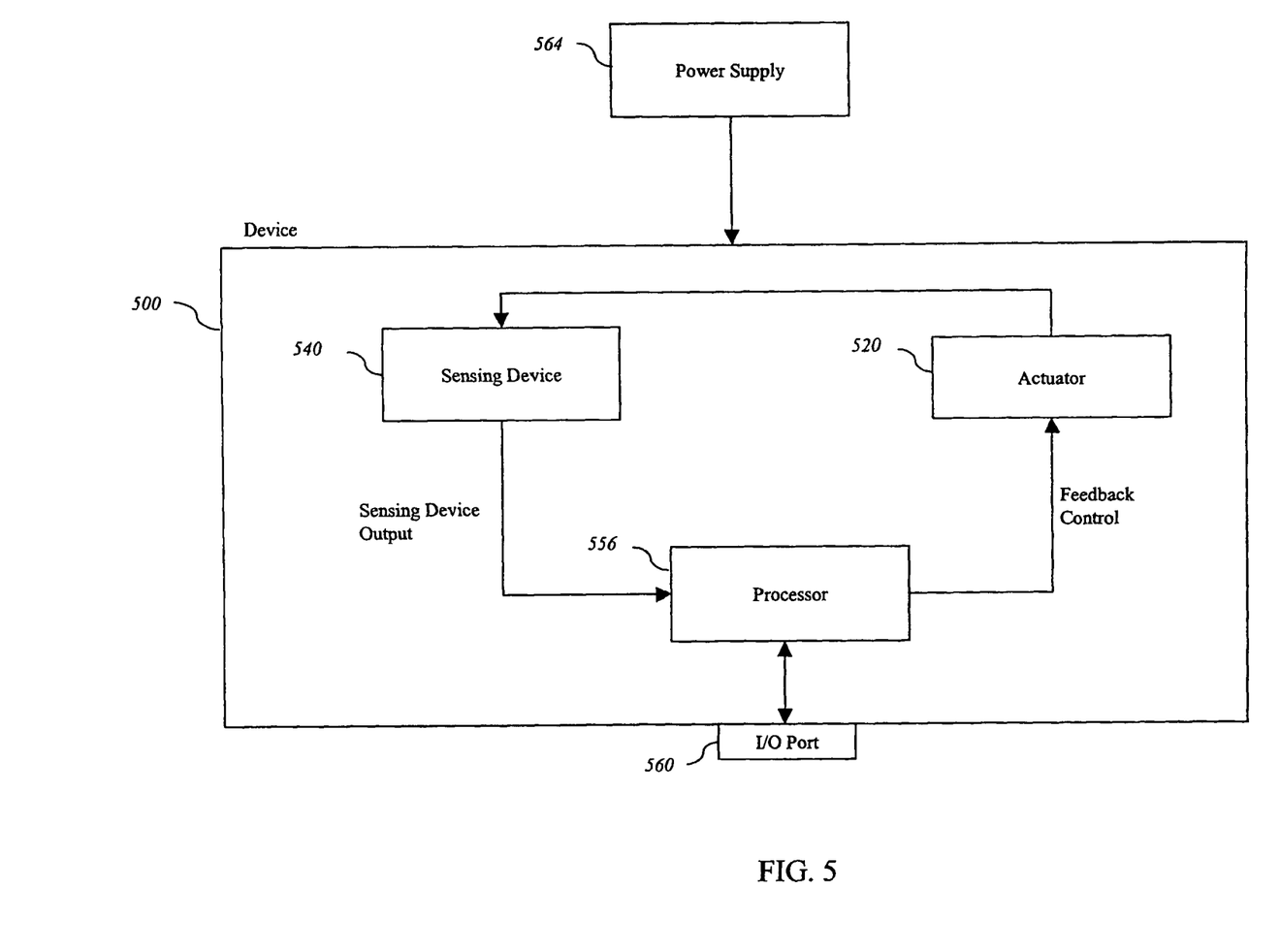
FIG. 5 is a block diagram, illustrating one embodiment of a haptic feedback device according to the present invention.

Referring again to the figures, FIG. 5 is a block diagram, illustrating one embodiment of a resistive feedback device according to the present invention. In the embodiment shown, the resistive feedback device 500 comprises a sensing device 540. The sensing device 540 may comprise one of the sensors discussed above or various other types of sensors. The sensing device 540 may be configured to sense, for example, a movement of a manipulandum (such as a control knob) with respect to the sensing device 540.

The device 500 also comprises an actuator 520, such as an electromagnetic or piezo-electric brake. The sensing device 540 and the actuator 520 shown are both in communication with a processor 556. The processor 556 may receive sensor information in the form of a sensor output signal from the sensing device 540, may perform control algorithms, and may provide feedback control signals to the actuator 520. For example, in one embodiment, the sensing device 540 may output a sensor output signal comprising information from which the processor 556 may ascertain that the manipulandum has been restored to a position associated with a barrier effect by flexure configured to provide the manipulandum with a degree of rotational flexibility.

The device shown in FIG. 5 further comprises an input/output (I/O) port 560, such as a game port, for performing bi-directional communication with external devices utilizing an embodiment of the present invention. In the embodiment shown, the device 500 receives power from an external power supply 564. In other embodiments, power may be supplied through the I/O port 560 or by utilizing an internal power supply (such as a battery). Various embodiments may utilize additional components as well, such as an amplifier to amplify signals to the actuator.

Figure 6:
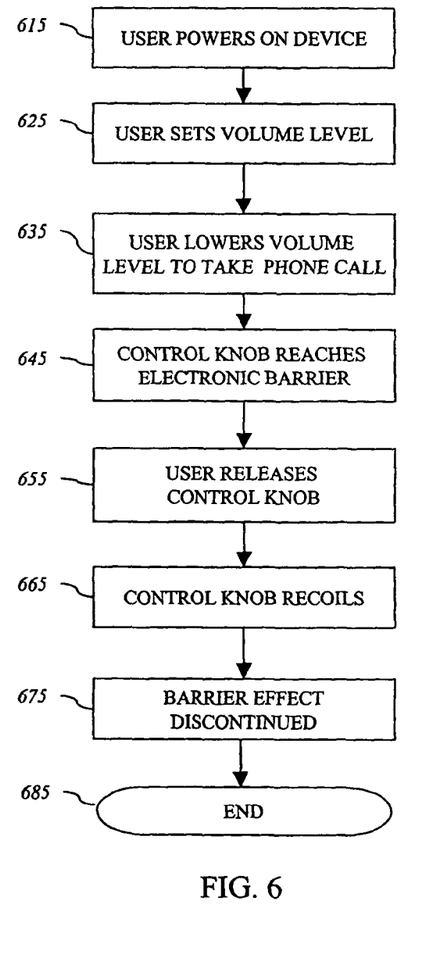
FIG. 6 is a flowchart, illustrating a process of controlling a volume level of a stereo receiver device utilizing one embodiment of the present invention.

FIG. 6 is a flowchart illustrating a process of changing a volume level on a stereo receiver remote control utilizing an embodiment of the present invention. The method illustrated in FIG. 6 is described with reference to the remote control device (100) shown in FIG. 1. The device (100) comprises a control knob (102) manipulandum. For example, the control knob (102) may be the control knob (202) of FIG. 2 or the scroll wheel (402) of FIG. 4.

The user of the device (100) may wish to use a stereo receiver in communication with the device (100). The user may then utilize an interface device, such as a power button (107a), to turn on the stereo as shown in box 615. The user may then wish to adjust the volume of the stereo. The user may then push the control knob (102) until the control screen (104) displays level indicators (105) and/or limit indicators (106) that indicate that the control knob (102) is presently controlling the volume of the stereo. The user may then increase the volume of the stereo by turning the control knob (102) clockwise until the pointer (103) points towards the level indicator (105) associated with the volume level the user desires as shown in box 625. A sensor of a sensing device may sense a coding on a first element (208) coupled to the control knob (102) as described above when the user turns the control knob (102). From the coding, the sensing device may be able to ascertain the relative movement of a first element (208) with respect to the sensing device, and therefrom the position of the control knob (102). The sensing device may then send the sensed information in a sensing device output signal to a processor.

If the user receives a phone call, and wishes to turn the volume all the way down to hear the caller, he or she may do so by turning the control knob (102) counter-clockwise to the low volume limit indicator (106) as shown in box 635. The processor configured to receive the sensing device's output signal may communicate with an actuator (220) as described with respect to FIG. 5 by sending a feedback control signal. The feedback control signal may comprise, for example, an electric current supplied by a power supply to a copper coil (216) of an electromagnetic actuator (220).

The electromagnetic coil (216) of the actuator (220) may receive the feedback control signal sent by the processor. The actuator (220) may then exert such a great normal force on the first element (208) that the first and second brake surfaces (212, 214) cannot substantially be moved with respect to each other. This contact may cause a barrier effect in the device (100), comprising a strong resistance to further movement of the control knob (102) by the user as shown by box 645. The barrier effect may substantially prevent the control knob (102) from turning counterclockwise when the pointer (103) points towards the low volume limit indicator (106). For example, in one embodiment, an electromagnetic core second element (210) may be turned into an electromagnet and exert the normal force on the first element (208). The force exerted on the first element (208) may cause a strong resistance to the turning of the control knob (102) due to the friction created between the first and second brake surfaces (212, 214).

The contact of the first and second brake surfaces (212, 214) may create a resistance to the movement of the control knob (102) coupled to the first element (208). The device (100) comprises a flexure configured to provide the control knob (102) with a degree of rotational flexibility, such as the flexure (206) described with respect to FIGS. 2 and 3, or the flexure (406) described with respect to FIG. 4. When the user turns the control knob (102) counter-clockwise to the point where the pointer (103) points at the low volume limit indicator (106) while the actuator (220) provides a barrier effect, the flexure may provide the control knob (102) with a small amount of rotational travel in a counterclockwise direction beyond the low volume limit indicator (106). Once the user reaches the extent of the rotational flexibility provided by the flexure (206), he or she may let go of the control knob (102) as shown in box 655.

Referring still to FIG. 6, the flexure (206) may then provide a restoring force to the control knob (102) that centers a common axis of the first and second elements (208, 210), and recoils the control knob (102) in a clockwise direction as shown in box 665. The sensing device may sense the recoil of the control knob (102) provided by the flexure (206). The sensing device may then send a sensor output signal to the processor device.

The processor device may then send a feedback signal to the actuator (220) that causes the actuator to discontinue exerting the force on the first element (208) as shown in box 675. The user may then raise the volume when his or her phone call is over by turning the control knob (102) clockwise without encountering the resistance of the barrier effect provided by the actuator (220). Once the barrier effect has been released, the process ends as shown in box 685.

Various other types of effects may be utilized. For example, in one embodiment, the actuator may provide a "bump" when the pointer (103) points toward a level indicator (105). If the user continues to scroll past the bump, the volume of the stereo device in communication with the device (100) may be increased or decreased depending on the direction the user turns the control knob (102).

Embodiments of the present invention may be incorporated into a broad array of devices. For example, a cell phone may incorporate a scroll drum according to this invention for use in navigating a menu structure. A television remote control may also incorporate an embodiment of the present invention for channel navigation, volume control, and other related functions. Similarly, an audio component remote control may utilize an embodiment for volume control or other audio control. In one embodiment, a single control module may be provided configured to control various functions of various electronic and mechanical components of an automobile. A laptop computer may utilize an embodiment for navigation, volume control, or any other function utilizing a scroll wheel, scroll drum, linear slider, or similar user interface device. PDA's, handheld navigation, and handheld email appliances may also benefit from utilizing an embodiment of the present invention.

A camera may utilize an embodiment of the present invention for user control of the focus, f-stop, menu navigation, and other camera-related functions. Since the effects provided by the actuator may be programmable, one manipulandum may be utilized to perform many or all of the functions on the camera. A video recorder may utilize an embodiment of the present invention to provide functions such as shuttle, fast forward, and reverse. An actuator may create detents on a frame-by-frame basis for the shuttle function and hard stops for fast forward and reverse.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. An apparatus comprising:
a first element having a first brake surface;
a second element having a second brake surface configured to contact the first brake surface;
at least one actuator configured to exert a force on the first element or the second element; and
a flexure coupled to the apparatus to provide a degree of rotational flexibility to a manipulandum when the at least one actuator exerts the force.

2. The apparatus of claim 1, further comprising a processor in communication with the at least one actuator, the processor configured to generate a control signal operable to cause the at least one actuator to provide a haptic effect to the manipulandum.

3. The apparatus of claim 1, wherein the at least one actuator is configured to exert the force to provide a haptic effect.

4. The apparatus of claim 1, wherein the at least one actuator comprises a resistive actuator.

5. The apparatus of claim 4, wherein the first element comprises a magnetic target, and the second element comprises a magnetic core.

6. The apparatus of claim 4, wherein the first element comprises a magnetic core, and the second element comprises a magnetic target.

7. The apparatus of claim 1, wherein the flexure is further configured to provide a restoring force to the first element or the second element.

8. The apparatus of claim 7, wherein the restoring force comprises a centering force with respect to a rotational axis common to the first and second elements.

9. The apparatus of claim 1, wherein the flexure is further configured to maintain contact between the first and second brake surfaces.

10. The apparatus of claim 1, wherein the flexure is further configured to provide the manipulandum with a degree of axial flexibility.

11. The apparatus of claim 1, wherein the flexure is further configured to provide the manipulandum with a degree of radial flexibility.

12. The apparatus of claim 1, wherein the flexure is further configured to provide the manipulandum with a degree of lateral flexibility.

13. The apparatus of claim 1, wherein the flexure is further configured to provide the manipulandum with a degree of angular flexibility.

14. The apparatus of claim 1, wherein the flexure comprises at least one beam.

15. The apparatus of claim 14, wherein the at least one beam comprises a plurality of beams.

16. The apparatus of claim 14, wherein the at least one beam comprises a fixed end coupled to the flexure, and a deflectable end.

17. The apparatus of claim 16, wherein the deflectable end is coupled to the first element, the second element, a housing, the manipulandum, or a shaft coupled to the manipulandum.

18. The apparatus of claim 16, wherein the flexure is rigidly coupled to a shaft coupled to the manipulandum and the deflectable end is flexibly coupled to the first element.

19. The apparatus of claim 16, wherein the flexure is rigidly coupled to a housing, and the deflectable end is flexibly coupled to the second element.

20. The apparatus of claim 16, wherein the flexure is rigidly coupled to the second element, and the deflectable end is flexibly coupled to a housing.

21. The apparatus of claim 1, wherein at least a portion of the flexure is mechanically grounded.

22. The apparatus of claim 21, wherein at least the portion of the flexure is mechanically grounded to a housing.

23. The apparatus of claim 1, wherein the flexure comprises an integral part of a housing.

24. The apparatus of claim 1, further comprising a sensing device in communication with the first element, the second element, or the manipulandum.

25. The apparatus of claim 1, wherein the flexure is coupled to at least one portion of the apparatus selected from the group consisting of the first element, the second element, a housing, a manipulandum, a coil, and a shaft coupled to the manipulandum.

26. The apparatus of claim 1, wherein the at least one actuator comprises a first actuator configured to exert a first force on the first element or the second element, and a second actuator configured to exert a second force on the first element or the second element.

27. The apparatus of claim 26, wherein the first actuator comprises an active actuator, and the second actuator comprises a resistive actuator coupled to the manipulandum, wherein both the first and the second actuators are configured to provide a haptic effect to the manipulandum.

28. A method comprising:
providing a first element having a first brake surface;
providing a second element having a second brake surface configured to contact the first brake surface;
providing at least one actuator configured to exert a force on the first element or the second element; and
providing a flexure coupled to the apparatus to provide a degree of rotational flexibility to a manipulandum when the at least one actuator exerts the force.

29. The method of claim 28, further comprising providing a processor in communication with the at least one actuator, the processor configured to generate a control signal operable to cause the at least one actuator to provide a haptic effect to the manipulandum.

30. The method of claim 28, wherein the at least one actuator is configured to exert the force to provide a haptic effect.

31. The method of claim 28, wherein the at least one actuator comprises a resistive actuator.

32. The method of claim 31, wherein the first element comprises a magnetic target, and the second element comprises a magnetic core.

33. The method of claim 31, wherein the first element comprises a magnetic core, and the second element comprises a magnetic target.

34. The method of claim 28, wherein the flexure is further configured to provide a restoring force to the first element or the second element.

35. The method of claim 34, wherein the restoring force comprises a centering force with respect to a rotational axis common to the first and second elements.

36. The method of claim 28, wherein the flexure is further configured to maintain contact between the first and second brake surfaces.

37. The method of claim 28, wherein the flexure is further configured to provide the manipulandum with a degree of axial flexibility.

38. The method of claim 28, wherein the flexure is further configured to provide the manipulandum with a degree of radial flexibility.

39. The method of claim 28, wherein the flexure is further configured to provide the manipulandum with a degree of lateral flexibility.

40. The method of claim 28, wherein the flexure is further configured to provide the manipulandum with a degree of angular flexibility.

41. The method of claim 28, wherein the flexure comprises at least one beam.

42. The method of claim 41, wherein the at least one beam comprises a plurality of beams.

43. The method of claim 41, wherein the at least one beam comprises a fixed end coupled to the flexure, and a deflectable end.

44. The method of claim 43, wherein the deflectable end is coupled to the first element, the second element, the housing, the manipulandum, or a shaft coupled to the manipulandum.

45. The method of claim 43, wherein the flexure is rigidly coupled to a shaft coupled to the manipulandum and the deflectable end is flexibly coupled to the first element.

46. The method of claim 43, wherein the flexure is rigidly coupled to a housing, and the deflectable end is flexibly coupled to the second element.

47. The method of claim 43, wherein the flexure is rigidly coupled to the second element, and the deflectable end is flexibly coupled to a housing.

48. The method of claim 28, wherein at least a portion of the flexure is mechanically grounded.

49. The method of claim 48, wherein at least the portion of the flexure is mechanically grounded to a housing.

50. The method of claim 28, wherein the flexure comprises an integral part of a housing.

51. The method of claim 28, further comprising providing a sensing device in communication with the first element, the second element, or the manipulandum.

52. The method of claim 28, wherein the flexure is coupled to at least one portion of the apparatus selected from the group consisting of the first element, the second element, a housing, a manipulandum, a coil, and a shaft coupled to the manipulandum.

53. The method of claim 28, wherein the at least one actuator comprises a first actuator configured to exert a first force on the first element or the second element, and a second actuator configured to exert a second force on the first element or the second element.

54. The method of claim 53, wherein the first actuator comprises an active actuator, and the second actuator comprises a resistive actuator coupled to the manipulandum, wherein both the first and the second actuators are configured to provide a haptic effect to the manipulandum.

* * * * *